UNITED STATES PATENT OFFICE.

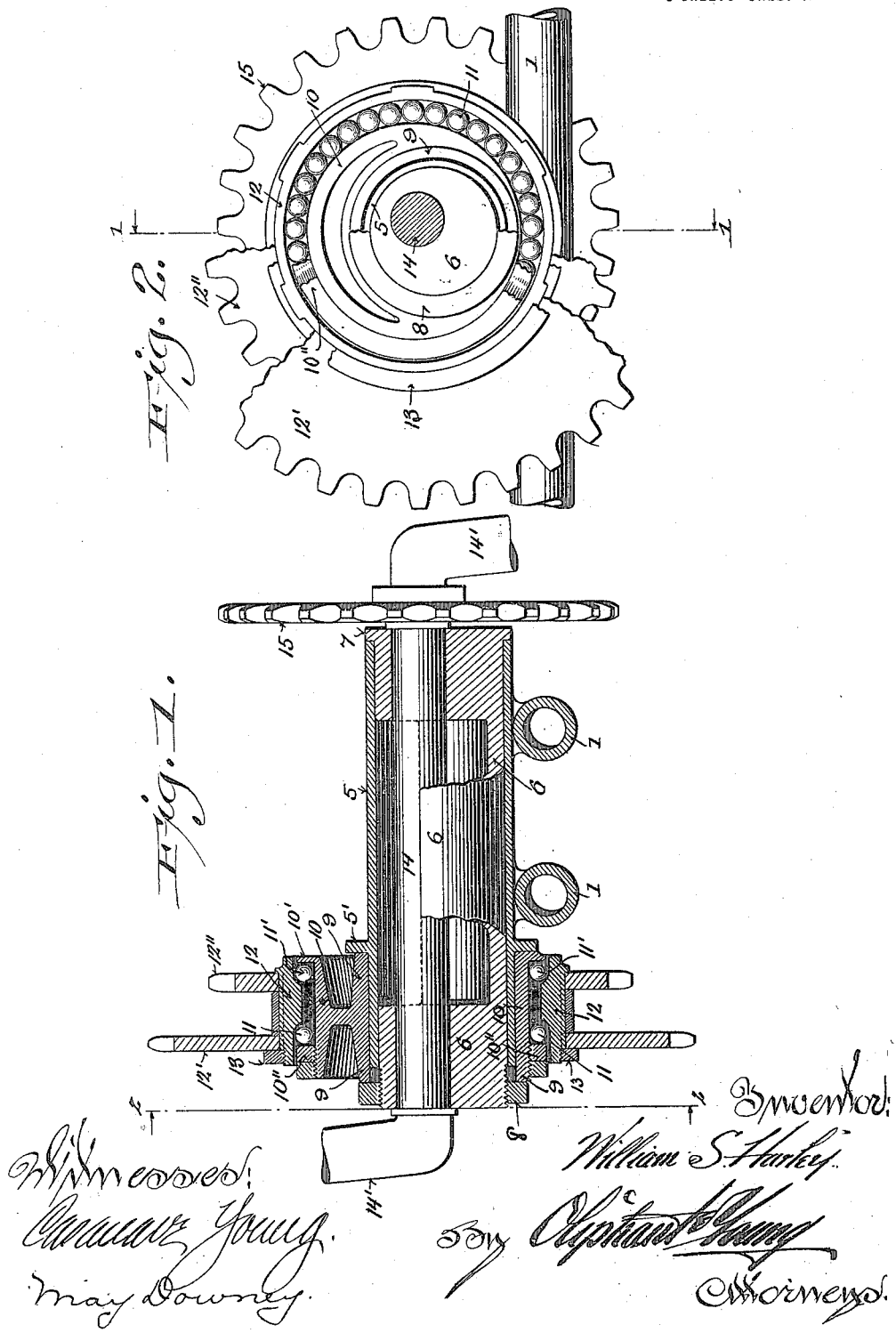

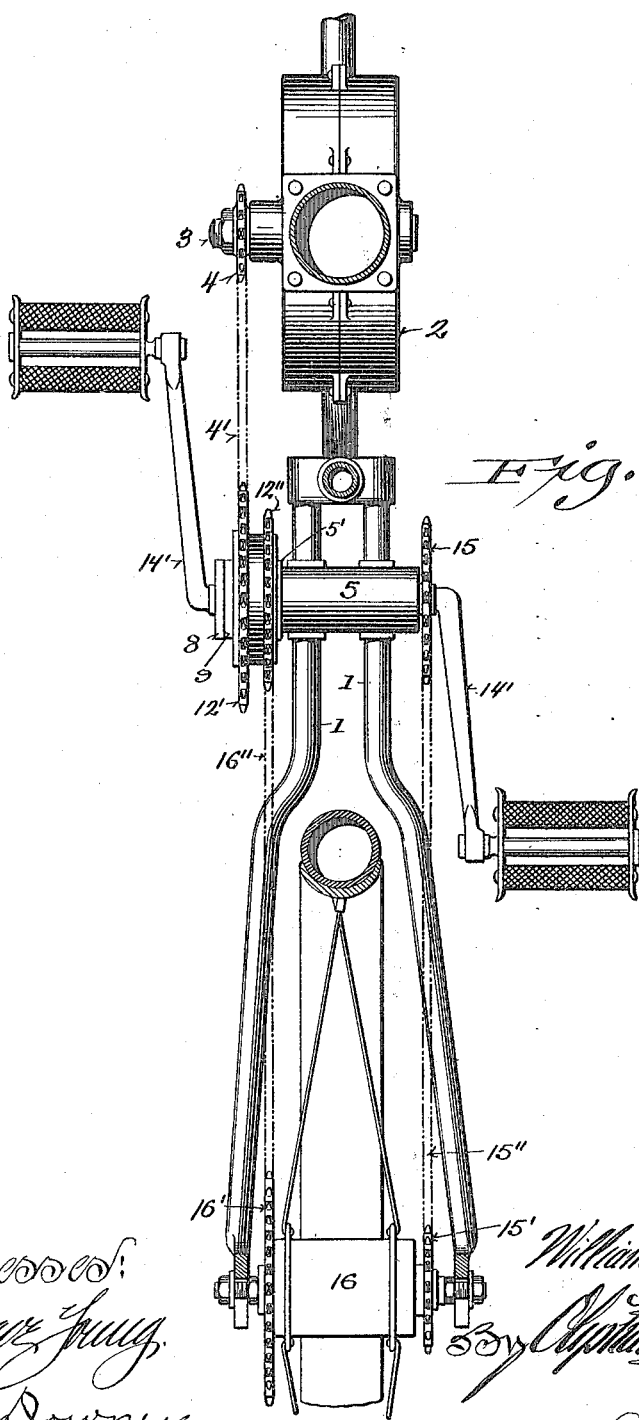

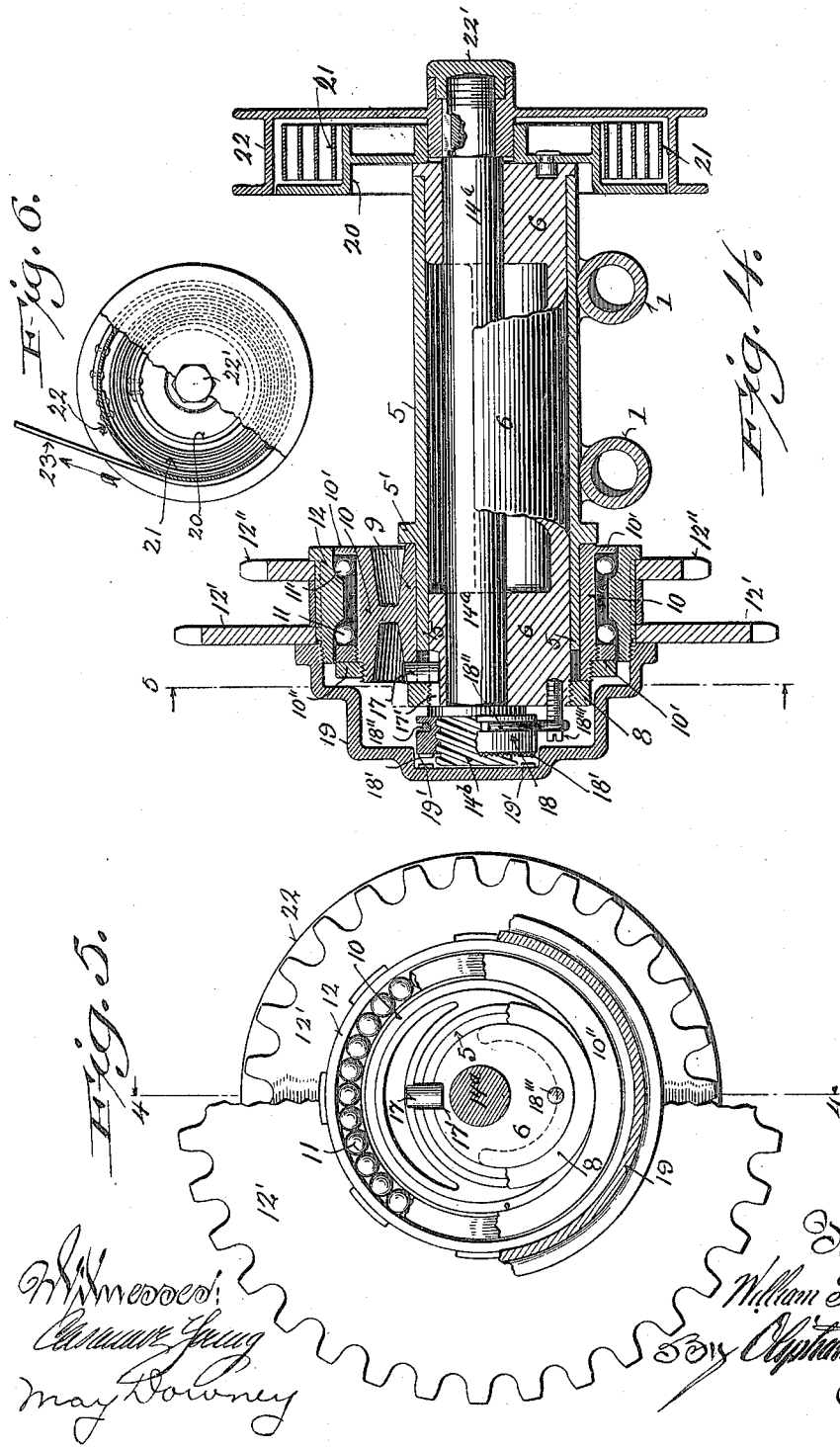

WILLIAM S. HARLEY, OF MILWAUKEE, WISCONSIN, ASSIGNOR TO HARLEY-DAVIDSON MOTOR CO., OF MILWAUKEE, WISCONSIN.

TRANSMISSION-GEARING.

1,137,134.     Specification of Letters Patent.     Patented Apr. 27, 1915.

Application filed July 13, 1912. Serial No. 709,160.

*To all whom it may concern:*

Be it known that I, WILLIAM S. HARLEY, a citizen of the United States, and resident of Milwaukee, in the county of Milwaukee and State of Wisconsin, have invented certain new and useful Improvements in Transmission-Gearing; and I do hereby declare that the following is a full, clear, and exact description thereof.

My invention refers to transmission gearing of the belt type, its object being to provide simple, economical and effective means for adjusting the tension of such belts and to provide means for effecting an initial starting movement of the belt-gearing whereby an engine of the gas type is given an initial explosion.

Specific objects of my invention are to provide a shaft hanger having an internal eccentric which constitutes a support for a counter-shaft, and to also provide an eccentric that is mounted exteriorly of the hanger, which eccentric constitutes a bearing for one or more gear-wheels whereby the belt connections therewith are adjusted, and to provide an automatic clutch mechanism between the shaft and the gear-wheels whereby an initial starting movement is imparted to the engine through its belt connections to said gear-wheels.

With the above objects in view the invention consists in certain peculiarities of construction and combination of parts as hereinafter set forth with reference to the accompanying drawings and subsequently claimed.

In the drawings Figure 1 represents a sectional view of a shaft hanger embodying the features of my invention, the section being indicated by line 1—1 of Fig. 2; Fig. 2, a detailed end sectional view of the same, the section being indicated by line 2—2 of Fig. 1; Fig. 3, a plan view upon a reduced scale of a portion of a motorcycle frame showing the arrangement of gears and hanger in connection with the rear or drive wheel of a motorcycle and the engine; Fig. 4 represents a sectional elevation of a shaft hanger embodying transmission gearing showing a modified form of my invention; Fig. 5, a detailed cross-sectional view of the same, the section being indicated by line 5—5 of Fig. 4, and Fig. 6, another cross-sectional view of the same upon a reduced scale.

Referring by characters to the drawings, with especial reference to Figs. 1 to 3 inclusive, 1, 1, represent parallel tubular struts that form part of the rear fork of a motorcycle frame, and 2 indicates an engine supported thereon, the crank-shaft 3 of which carries a sprocket-wheel 4 that is fast to one end of said crank-shaft. Secured to the tubular struts 1 of the frame and rearwardly of the engine is a tubular transversely disposed hanger 5 having seated therein an eccentric barrel 6 that is preferably in skeleton form. One end of the eccentrically bored barrel is provided with a flange 7 that abuts the hanger end, while the opposite end of said barrel extends beyond the hanger and is threaded for the reception of a clamping nut 8. The nut 8 also engages the hub 9 of an eccentric bearing-collar 10, the said hub being fitted over the adjacent end of the tubular hanger with its rear face in engagement with a flange 5' of said hanger, the collar constituting an eccentric that is revoluble about the hanger and is adapted to be adjusted independently of the inner eccentric. Thus when the clamping nut 8 of the eccentric barrel 6 is tightened end draw upon said barrel will cause its flange 7 to firmly grip the hanger coincident to grip of the eccentric collar-hub 9 between the hanger flange 5' and the nut 8, whereby both of the eccentrically disposed members are frictionally locked against rotation. The circular face of the eccentric collar 10 forms a race for two sets of anti-friction balls 11, 11', that are seated in circular grooves of the hub 12, which hub carries a pair of sprocket-wheels 12', 12", the same being spaced apart and suitably secured to the hub member 12 by a spanner ring 13 that is in threaded engagement with said hub. It should be understood that the hub 12 and sprockets 12' and 12" may, in some instances, be formed in a single piece, but, for convenience in assemblage and manufacture they are stamped from separate members and assembled as stated, the construction of said sprocket-wheels forming no part of my invention.

The sprocket-wheel hub bearing-balls 11 and 11' are held in their respective seats by a flanged extension 10' of the collar and a ring 10", which ring is in threaded union with the end of the collar as best shown in Fig. 1.

Mounted in the eccentrically bored aperture of the barrel 6 is a shaft 14 having cranked ends 14' that are arranged to receive the ordinary foot pedals. This shaft also carries a sprocket-wheel 15 that is disposed upon the opposite side of the hanger from that occupied by the eccentrically arranged double-faced sprocket-wheel.

The sprocket-wheel 15 constitutes a starting wheel for the engine and is connected with a sprocket-wheel 15' by a starting belt 15'', the sprocket-wheel 15' being in clutch connection with a hub 16 of a drive-wheel that is ordinarily employed in motorcycle construction. The clutch connection between the sprocket-wheel 15' and hub of the drive-wheel is of the coaster type, the same forming no part of my invention and is therefore not shown. The drive-wheel hub 16 also carries a drive sprocket-wheel 16' that is connected with the sprocket-wheel 12'' by a drive chain 16'', said wheel being one of those which are mounted upon the eccentric collar 10. The companion sprocket-wheel 12' that is also mounted upon the eccentric collar 10 is connected to the sprocket-wheel 4 of the engine by an engine chain belt 4'.

By providing the independently adjustable eccentrics as described, it is apparent that the crank-shaft can be adjusted through manipulation of the eccentric barrel in order to tighten or loosen the starting belt 15'' and thereafter the tension of the driving and engine belts 16'', 4', respectively, can be balanced or compensated by shifting the eccentric bearing collar 10, both of said eccentrics being thereafter locked by the clamping nut 8. Thus the two eccentric members, when utilized in connection with the three belt elements, are adjusted independently of each other as, in this instance, there is no requirement for a connection between the crank-shaft and the double sprocket-wheel 12', 12''.

From the foregoing description it is apparent by referring to Fig. 3, that when it is desired to start the engine the operator will revolve the crank-shaft 14, motion therefrom being imparted to the drive-wheel hub and from thence to the engine through the drive and engine belts 16'' and 4' respectively.

Figs. 4 to 6 inclusive illustrate another form of my invention wherein the starting chain connection to the drive-wheel hub is dispensed with, the starting operation being effected through a clutch connection between the eccentrically disposed shaft 14ª and the eccentrically mounted sprocket-wheel hub 12 that carries the pair of sprocket-wheels 12', 12''. In the above referred to form the hanger 5, eccentrically bored barrel 6, eccentric collar 10 and sprocket-wheels mounted thereon are all similar to the construction shown and described in connection with Figs. 1 to 3 inclusive. In this instance however it is essential that the shaft 14ª should remain at all times concentric with the sprocket-wheel hub 12 and to accomplish the desired result the eccentric barrel 6 and collar 10 are simultaneously adjusted about the tubular hanger in such relative positions that the shaft axis is concentric with the circular bearing face of the collar at all times, whereby the sprocket-wheels will be rotated about the shaft axis. To accomplish this simultaneous adjustment of the eccentric members, the same are keyed together in a concentric position relative to the shaft axis by a pin 17, which pin is seated within a notch of the hub 9 and a keyway 17' that is formed in the end of the barrel 6, the said end being extended beyond the hanger. The two eccentric members, together with the shaft, can thus be revolubly adjusted about the axis of the tubular hanger to effect a balance in the tension between the engine and drive belts respectively, the eccentric members being thereafter clamped by the nut 8 in the manner previously described. Hence it will be seen that the hanger mechanism can be utilized either in connection with a belt starter or a spring-power starter to be hereinafter described, it being understood that when the hanger mechanism is utilized in connection with a spring starter that the crank-shaft 14 and double gear wheel 12', 12'', must be concentrically disposed with relation to each other and in clutch connection. Attention is also called to the fact that, by utilizing separate eccentric members wherein one of the members comprising the collar 10 is mounted upon the hanger 5, that the strain upon this eccentric collar or bearing is thus removed from the drive-shaft which is mounted within the hanger.

The adjacent end of the shaft 14ª, that protrudes through the barrel, is provided with a threaded head 14ᵇ for the reception of a clutch member 18, the same being in the form of a nut having radially disposed teeth 18' that extend from one face thereof and are adapted to engage corresponding teeth 19' of a second clutch member 19, which member is secured to the sprocket-wheel hub 12, by a threaded engagement therewith and in this instance forms a substitute for the clamping ring 13, it being understood that this clutch member may in some instances be formed an integral part of the sprocket-wheels 12' and 12'' and incidentally the said clutch member constitutes a dust guard for the contiguous parts. The clutch member 18 is provided with an annular groove for the reception of a friction ring 18'' whereby said clutch member or nut is frictionally gripped to prevent rotation except when the latter is in positive clutching engagement with the clutch member 19, the ring being in turn positively held against movement by a stud 18''', that projects from the barrel and is fitted within an eye of the ring, whereby the nut or clutch member 18 is free to move in or out coincident with rotation of the shaft. Secured to the opposite end of the barrel 6 is a flanged disk 20 to the face of which is secured one end of the flat coiled spring 21, the opposite end of this spring being fast to the inner face of a pulley 22. This pulley 22 is secured to the protruding end of the shaft 14ª by a suitable nut 22'. The pulley 22 has secured to its outer face one end of a cable or strap 23, which strap is coiled about said face and arranged to be attached to any suitable means for effecting a manual draw thereon, whereby the shaft is given a partial or one or more turns to effect a starting operation of the engine.

To start the engine by the spring and pulley connection a pull upon the strap is exerted by the operator in the direction indicated by the arrow, Fig. 6, causing the coiled spring to be wound and co-incident with winding of said spring the shaft 14ª will be rotated in the direction indicated by the arrow in Fig. 4. This movement will cause a locking engagement between the clutch members 18 and 19 whereby the sprocket-wheels 12', 12'' are rotated and through their belt connection with the engine the same is turned over to produce the initial spark. When the engine picks up the operator will release the strap 23, whereby the coiled spring will cause the shaft 14ª to rotate in a reverse direction and the clutch member or nut 18 will thus be retracted from its locked position with relation to the clutch 19 and the gear-wheels are now free from the starting shaft, whereby the transmission gear will impart direct drive to the rear wheel of the motorcycle.

While I have shown and described a quick thread in connection with the shaft for effecting the clutching engagement it is apparent that a pawl and ratchet movement can be substituted for said clutch mechanism shown without departing from the spirit of my invention or any other well known type of clutch construction may be employed.

I claim:

1. A transmission gearing comprising a tubular hanger, a rotatory adjustable barrel mounted in the hanger provided with an eccentric bore, a shaft journaled in the eccentric barrel bore, an outer rotatorily adjustable eccentric mounted exteriorly of the hanger, means for securing the barrel and outer eccentric to the hanger and a wheel mounted upon said eccentric.

2. A transmission gearing comprising a tubular hanger, a rotatory adjustable barrel mounted in the hanger provided with an eccentric bore, a flange projecting from one end of the barrel in engagement with the hanger, the opposite end of said barrel being extended beyond the hanger and provided with screw threads, a flange projecting from the exterior wall of the tubular hanger juxtaposing its end, a rotatory adjustable eccentric mounted upon said end of the hanger adapted to abut the hanger flange, a clamping nut engageable with the threaded end of the barrel and adapted to bind the rotatory eccentric between the face of the nut and hanger flange, a wheel mounted upon the rotatory adjustable eccentric, and a shaft mounted in the eccentric bore of said barrel.

In testimony that I claim the foregoing I have hereunto set my hand at Milwaukee in the county of Milwaukee and State of Wisconsin in the presence of two witnesses.

WILLIAM S. HARLEY.

Witnesses:
 E. J. MUELLER,
 ARTHUR DAVIDSON.

Copies of this patent may be obtained for five cents each, by addressing the "Commissioner of Patents, Washington, D. C."